Figure 1:
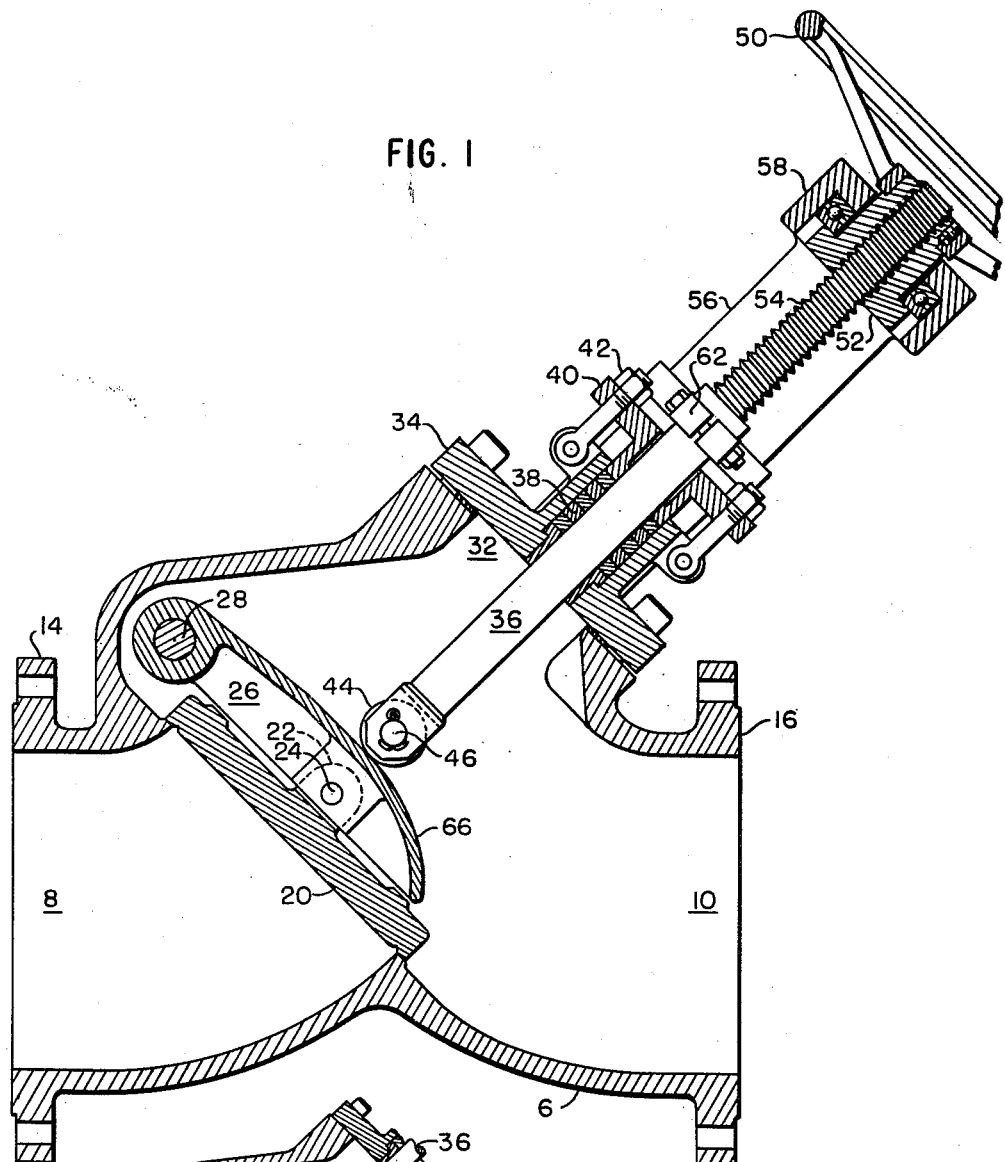

INVENTORS
NORMAN F. PRESCOTT
ALEXANDER V. HOSE

ATTORNEYS

United States Patent Office 3,190,611
Patented June 22, 1965

3,190,611
CHECK VALVE WITH POSITIVE
CLOSING MEANS
Norman F. Prescott, Wenham, and Alexander V. Hose, Marblehead, Mass., assignors to Atwood & Morrill Co., Salem, Mass., a corporation of Massachusetts
Filed Feb. 27, 1963, Ser. No. 261,293
1 Claim. (Cl. 251—266)

The present invention relates to check valves, and more particularly to check valves of the type which may be positively closed when it is desired to shut off all flow in the direction normally tending to open the valve.

In many types of fluid flow systems, it is customary to utilize a check valve to permit free flow in one direction, while preventing flow in the reverse direction. Generally it is desirable to provide large open passages and the least possible change of direction of flow for minimum pressure drop when the valve is open, and to cut off the flow promptly and effectively as soon as the flow begins to reverse its direction.

It is often necessary, in a line of piping including a check valve, to make provision for cutting off all flow in the forward or normal free-flow direction, to meet particular requirements of operation or control. While attempts have been made to provide check valves having positive closing means, generally the positive closing means has not proved effective to hold the valve closed against high fluid pressure, especially in valves of appreciable size. As a consequence, usual practice has been to provide a separate shut-off valve in tandem with the check valve to take care of the positive shut off requirement.

It is an object of the present invention to obviate the necessity of using separate check and shut off valves in systems employing check valves wherein positive shut off of flow in both directions is occasionally required, by providing a check valve embodying positive shut off means capable of closing the valve and securing it in closed condition against very substantial fluid pressures, even for relatively large valve sizes.

It is also an object of the invention to provide a combined check valve and positive closing valve wherein the provision of the positive closing feature in no way diminishes the effectiveness or reliability of the check valve in its normal function of providing flow in one direction at low pressure drop with rapid closing upon the initiation of reverse flow.

In accordance with these and other objects, a feature of the invention involves the provision of a check valve of the swing disc type, having positive closing mechanism which is adapted to apply powerful seating pressure to the valve disc substantially at its center and in a direction perpendicular to the seat. In particular the positive closing mechanism is constructed and arranged to insure that a favorable mechanical advantage is available over substantially the entire closing range, without tendency to bind or distort the operating instrumentalities at any point within the range of movement. As a further feature, the valve of the invention is adapted to function effectively in either a horizontal or vertical run of piping.

Figure 2:
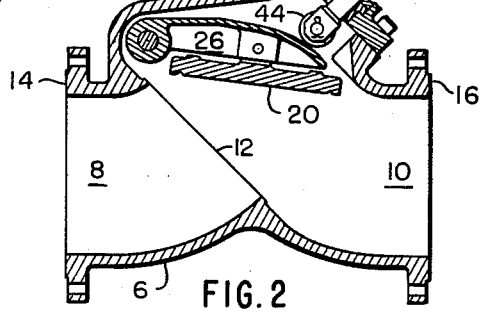

In the drawings illustrating the invention,

FIG. 1 is a sectional view showing the valve secured in closed position by the positive closing means, and FIG. 2 is a view on a somewhat smaller scale showing the positive closing means in retracted position with the valve disc open, corresponding to free flow of fluid from left to right.

The valve body indicated generally at 6 is provided with aligned inlet and outlet passages 8 and 10. Intermediate these passages the valve seat 12 is obliquely disposed at an angle of approximately 45° to the flow axis at inlet and outlet. The inlet passage curves slightly toward the seat, and the outlet passage likewise curves slightly to provide a smooth flow path through the valve when open. Parallel flanges 14 and 16 permit installation of the valve in a line of piping as readily as a conventional gate or globe valve, and the check valve is operative with the valve installed either horizontally or vertically.

The valve disc 20 is mounted for swinging movement into and out of engagement with the valve seat in accordance with flow conditions, unless constrained by the positive closing mechanism hereinafter described. The valve disc is provided with a lug 22 which is pivotally connected by pin 24 to arm 26 on shaft 28. The pivotal connection of arm and valve disc permits limited tilting movement of the valve disc relative to the arm to insure uniform seating pressure of the disc around the seat.

It is evident that in the construction so far described, the valve will serve effectively as a check valve, with the valve disc tightly closing the passage upon the initiation of reverse flow from right to left, yet opening freely to the position shown in FIG. 2 under the influence of normal forward flow. By reason of the configuration of the body and the disposition of the swinging valve disc, the valve may be made in relatively large sizes having very substantial flow capacity, yet capable of withstanding high operating pressures.

As has been indicated, it is an object of the invention to provide effective positive closing means by which the check valve function may temporarily be suspended and the valve closed positively and securely against normal forward flow. To this end, the valve body is provided with an opening 32 approximately opposite the valve seat 12. A cover or bonnet 34 secured to the valve body over said opening is provided with a passage for stem 36. A sliding seal is provided by the packing 38 compressed by gland 40 when nuts 42 are properly tightened.

At its inner end, the stem 36 is forked to receive a roller 44 on pin 46. The passage in bonnet 34 is positioned so that the stem is aligned with the center of the seat. Consequently the roller engages the arm 26 directly over the pivotal connection 24 between arm and disc when the disc is seated, as shown in FIG. 1.

To advance the stem and bring about positive closing of the valve, mechanism of conventional construction may be utilized. In the illustrative embodiment, a hand wheel 50 serves to rotate nut 52 on the threaded upper end 54 of the stem, with yoke arms 56 joining the thrust bearing support 58 with the main body of the bonnet. A collar 62 clamped to the stem provides non-rotating sliding connection with the yoke structure to prevent rotation of the stem as the hand wheel is rotated to advance and retract the stem.

To facilitate the operation of the positive closing mechanism, the arm 26 is provided with a curved track or surface 66 along which the roller 44 moves as the stem advances to close the valve against forward fluid pressure. Preferably the track surface has a curvature such that a tangent to said surface at the point of contact between roller and arm remains parallel to the valve seat and consequently perpendicular to the axis of the stem over the full range of movement of the valve disc. Such configuration insures that there will be no appreciable side thrust on the stem at any time during its advance from fully open to fully closed position of the valve. Thus, as shown in FIG. 2, when the valve is fully open, the roller bears against the arm somewhat outwardly of the pivotal mounting of the disc on the arm, but due to the curvature of the arm the force on the stem is directly in line with the stem axis. As the stem is urged inwardly by rotation of the hand wheel, or by other driving means capable of developing the requisite force, the arm and disc are swung in clockwise direction toward closed position, with the roller moving freely along the convex surface of the arm to apply the closing force along the axis of the stem. When the valve reaches fully closed position, as shown in FIG. 1, the force to hold the valve closed is applied directly over the pivotal support for the valve disc on the arm so that in effect it is as if the stem directly engaged the center of the disc and in a direction perpendicular to the plane of the seating surface.

The invention thus makes possible a check valve of large capacity, in which positive closing means is incorporated with a minimum of complexity, yet capable of providing extremely powerful closing force without tendency to bind or distort the parts, and without requiring that the closing force be applied through the supporting shaft about which the valve swings. In addition, the entire positive actuating mechanism may readily be withdrawn and removed from the valve body, with only a small access aperture required in the valve body, well shielded from the main flow passages when the valve is open, as illustrated in FIG. 2. There results a check valve that is capable of minimum pressure drop under normal flow, with no sacrifice in performance as a result of the inclusion of powerful positive closing mechanism which effectively eliminates the need for a second valve to provide positive shut-off.

We claim as our invention:

A check valve having positive closing means, comprising a valve body having an inlet and an outlet disposed on a flow axis, a valve seat intermediate the inlet and the outlet and disposed at an oblique angle of approximately forty-five degrees to said flow axis at inlet and outlet, the body having a curving passage between inlet and seat and a curving passage between seat and outlet, a valve disc, a support arm on which the valve disc is pivotally mounted adjacent its center for limited pivotal movement relative to said arm pivotal supporting means for said arm at one side of the flow passage downstream of the seat for supporting the valve disc for swinging movement into and out of engagement with the seat, an opening in the valve body generally opposite and aligned with the valve seat, a bonnet secured to the valve body over said opening, a stem extending through the bonnet along an axis substantially perpendicular to the plane of the valve seat and substantially centrally of the seat, a roller carried by the end of the stem within the body, means outside the body for advancing the stem through the bonnet with the roller in engagement with the support arm for the valve disc, means intermediate the stem and bonnet in axially-slidable engagement therebetween to maintain the pivot axis of the roller parallel to the pivotal axis of the support arm for the valve disc, said arm having a curved surface engaged by the roller and over which the roller moves as the stem advances, a tangent to said surface at the point of contact with the roller remaining substantially perpendicular to the stem over the range of movement of the roller along the arm as the valve disc is moved from open to closed position, the roller engaging the arm substantially in alignment with the pivotal connection between arm and valve disc when the disc is in closed position.

References Cited by the Examiner

UNITED STATES PATENTS

| | | | |
|---|---|---|---|
| 291,770 | 1/84 | Pratt | 251—228 |
| 831,798 | 9/06 | Morternd | 251—288 |
| 1,055,215 | 3/13 | Ordner | 251—228 |
| 1,725,428 | 8/29 | Tilden | 251—303 XR |

FOREIGN PATENTS 872,906   4/53   Germany.

ISADOR WEIL, *Primary Examiner.*